United States Patent
Shigenaga

(12) 
(10) Patent No.: US 6,295,073 B1
(45) Date of Patent: Sep. 25, 2001

(54) FIGURE FILLING APPARATUS

(75) Inventor: Satoshi Shigenaga, Nara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/325,859

(22) Filed: Jun. 4, 1999

(30) Foreign Application Priority Data

Jun. 8, 1998 (JP) .................................................. 10-158790

(51) Int. Cl.⁷ ..................................................... G06T 11/40
(52) U.S. Cl. ........................... 345/467; 382/199; 382/201; 382/203
(58) Field of Search ..................................... 345/467, 441, 345/418, 502, 440, 135, 25, 141, 192, 193, 195, 431; 358/448, 433, 431; 382/199, 200, 201, 203

(56) References Cited

U.S. PATENT DOCUMENTS

| | | | |
|---|---|---|---|
| 4,626,838 | * 12/1986 | Tsujioka et al. | 345/531 |
| 4,897,805 | * 1/1990 | Wang | 345/429 |
| 4,967,376 | 10/1990 | Katsura | 364/521 |
| 4,998,211 | 3/1991 | Hamada et al. | |
| 5,299,299 | * 3/1994 | Ohuchi | 345/426 |
| 5,561,534 | 10/1996 | Ishida et al. | 358/448 |
| 5,579,454 | * 11/1996 | Billyard et al. | 345/421 |
| 5,689,627 | * 11/1997 | Arai et al. | 345/423 |
| 5,748,777 | * 5/1998 | Katayama et al. | 382/199 |
| 5,831,624 | * 11/1998 | Tarolli et al. | 345/430 |

FOREIGN PATENT DOCUMENTS

| | | |
|---|---|---|
| 0 250 868 | 1/1988 | (EP) . |
| 0 522877 A2 | 1/1993 | (EP) . |
| 61-077984 | 4/1986 | (JP) .............................. G06F/15/62 |
| 64-73477 | 3/1989 | (JP) . |
| 01130289 | 5/1989 | (JP) . |
| 5-314271 | 11/1993 | (JP) . |
| 06162212 | 6/1994 | (JP) .............................. G06F/15/72 |
| 7-056557 A | 3/1995 | (JP) . |
| 8-096148 A | 4/1996 | (JP) . |
| 8-096149 A | 4/1996 | (JP) . |
| 8-305865 A | 11/1996 | (JP) . |
| 377705 | 1/2001 | (JP) . |

OTHER PUBLICATIONS

IBM Technical Disclosure Bulletin, vol. 33, No. 8, "Fast and Efficient Perimeter Drawing of Filled Polygons in a Graphics System", Jan. 1991, pp. 454–460.

* cited by examiner

*Primary Examiner*—Matthew Luu
*Assistant Examiner*—Thu-Thao Havan
(74) *Attorney, Agent, or Firm*—Harness, Dickey & Pierce, P.L.C.

(57) ABSTRACT

A vertex processing unit is provided for labeling each selected vertex dot as a vertical or horizontal attribute dot based on the direction of a side vector terminating at the vertex dot selected and that of a side vector originating from the vertex dot selected. A contour line segment processing unit is also provided for labeling each edge dot selected from a side as a vertical attribute dot if the y coordinate of the edge dot selected is different from that of a previous edge dot and that of a vertex dot located at the terminal point of the side, or otherwise, as a horizontal attribute dot. Contour color data are defined for the dots labeled as vertical or horizontal attribute dots. And inner color data are defined for the dots existing between an odd-numbered vertical attribute dot and an even-numbered vertical attribute dot, which is next to the former dot, on a selected scan line parallel to the axis of x coordinates, except for horizontal attribute dots.

6 Claims, 16 Drawing Sheets

Fig. 6

| DOT ATTRIBUTE BEING NEWLY DETERMINED | DOT ATTRIBUTE ALREADY STORED IN WORK MEMORY | NEW DOT ATTRIBUTE TO BE STORED IN WORK MEMORY |
|---|---|---|
| V | V | H |
| V | H | V |
| H | V | V |
| H | H | H |

FIGURE FILLING APPARATUS

BACKGROUND OF THE INVENTION

The present invention relates to an apparatus for use in computer graphics to fill a given figure by defining "contour color data" for each of a plurality of dots representing the contour of the figure and "inner color data" for each of another plurality of dots representing the inside of the figure, respectively. In this specification, the "computer graphics" includes not only producing an image on a CRT or liquid crystal display but also making a hardcopy using a printer, for example. The "figures" are not limited to two-or three-dimensional figures, but include many other graphics primitives such as characters and signs. The "colors" include not just chromatic colors, but achromatic colors.

An exemplary figure filling apparatus utilizing a so-called "edge fill algorithm" is disclosed in Japanese Laid-open Publication No. 6-162212. This apparatus draws a baseline near a polygon to be filled. A plurality of sides of the polygon are selected one by one, and a trapezoidal area is defined between this baseline and each side selected. Then, a plurality of dots, existing inside the trapezoidal area, are processed one after another. By repeatedly performing this processing, the polygon in question can be ultimately filled. In accordance with this technique, however, each dot should be processed numerous times. Thus, it is known that the larger the number of vertices of a polygon, the lower the resulting processing speed.

Examples of figure filling apparatuses adopting a so-called "scan algorithm" are disclosed in U.S. Pat. Nos. 4,967,376 and 5,561,534. In these apparatuses, a plurality of scan lines, crossing a figure to be filled, are drawn in parallel to a certain axis of coordinates. These scan lines are selected one by one, and a plurality of dots, existing on each scan line selected, are processed one after another. By repeatedly performing this processing, the polygon in question can be filled as a result.

In the apparatus disclosed in U.S. Pat. No. 4,967,376, however, when a doughnut-like figure with double contour loops is filled, for example, one of these two contour loops should be tracked clockwise, and the other counterclockwise (see FIGS. 2a and 2b of the patent).

Also, in the apparatus disclosed in U.S. Pat. No. 5,561,534, if the contour color data of a figure should be different from the inner color data thereof, the inner color data must be defined first for all the dots representing the inside of the figure. And then the contour color data must be defined for the respective dots representing the contour of the figure (see FIGS. 85 and 86 of the patent).

SUMMARY OF THE INVENTION

An object of the present invention is removing such restrictions that were imposed by those prior art figure filling apparatuses adopting the scan algorithm.

In order to achieve this object, the apparatus of the present invention includes means for labeling each of a plurality of dots representing the contour of a given figure as a vertical or horizontal attribute dot such that the number of vertical or horizontal attribute dots, existing on arbitrary one of scan lines parallel to a certain axis of coordinates, is always zero or an even number. The apparatus further includes means for defining contour color data for all the dots labeled as the vertical or horizontal attribute dots, selecting one of the scan lines parallel to the axis of coordinates after another, excluding horizontal attribute dots from all the dots on the scan line selected, and defining the inner color data for the remaining dots existing between an odd-numbered vertical attribute dot and an even-numbered vertical attribute dot, which is next to the former dot, on the scan line selected.

More specifically, the apparatus of the present invention includes a vertex coordinate information supply unit for supplying vertex coordinate information including x and y coordinates of each of a plurality of vertex dots of a given figure. The apparatus also includes a vertex processing unit for selecting one of the vertex dots after another, determining, from the vertex coordinate information, the direction of a first vector terminating at the selected vertex dot and originating from a previous vertex dot and the direction of a second vector originating from the selected vertex dot and terminating at a next vertex dot, and labeling the selected dot as a vertical or horizontal dot based on the directions of the first and second vectors. The apparatus further includes a contour line segment producing unit for selecting one pair of adjacent vertex dots after another from the vertex dots, and defining, from the vertex coordinate information, the x and y coordinates of each of a plurality of edge dots located on a contour line segment connecting together the two vertex dots selected. The apparatus further includes a contour line segment processing unit for selecting one of the edge dots on the contour line segment after another and labeling the selected edge dot as a vertical attribute dot if the y coordinate of the edge dot selected is different from that of a previous edge dot and that of the vertex dot located at the terminal point of the contour line segment, or otherwise, as a horizontal attribute dot. The apparatus further includes a color data defining unit for defining the contour color data for all the dots labeled by the vertex and contour line segment processing units as the vertical or horizontal attribute dots, selecting one of the scan lines parallel to the axis of x coordinates after another, excluding horizontal attribute dots from all the dots on the scan line selected, and defining the inner color data for the remaining dots existing between an odd-numbered vertical attribute dot and an even-numbered vertical attribute dot, which is next to the former dot, on the scan line selected.

BRIEF DESCRIPTION OF THE DRAWINGS

FIG. 5A illustrates a combination for a side with an ascent larger than 1;

FIG. 5B illustrates a combination for a side with an ascent smaller than 1; and

FIG. 5C illustrates a combination for a horizontal side.

FIG. 6 illustrates a rule relating to dot overlap processing for the figure filling apparatus shown in FIG. 1.

FIG. 13A illustrates a specific example of a figure to be filled; and

FIG. 13B illustrates resulting dot attributes defined for the contour of the figure shown in FIG. 13A.

FIG. 14A illustrates a specific example of a figure to be filled; and

FIG. 14B illustrates resulting dot attributes defined for the contour of the figure shown in FIG. 14A.

DETAILED DESCRIPTION OF THE INVENTION

Figure 1:
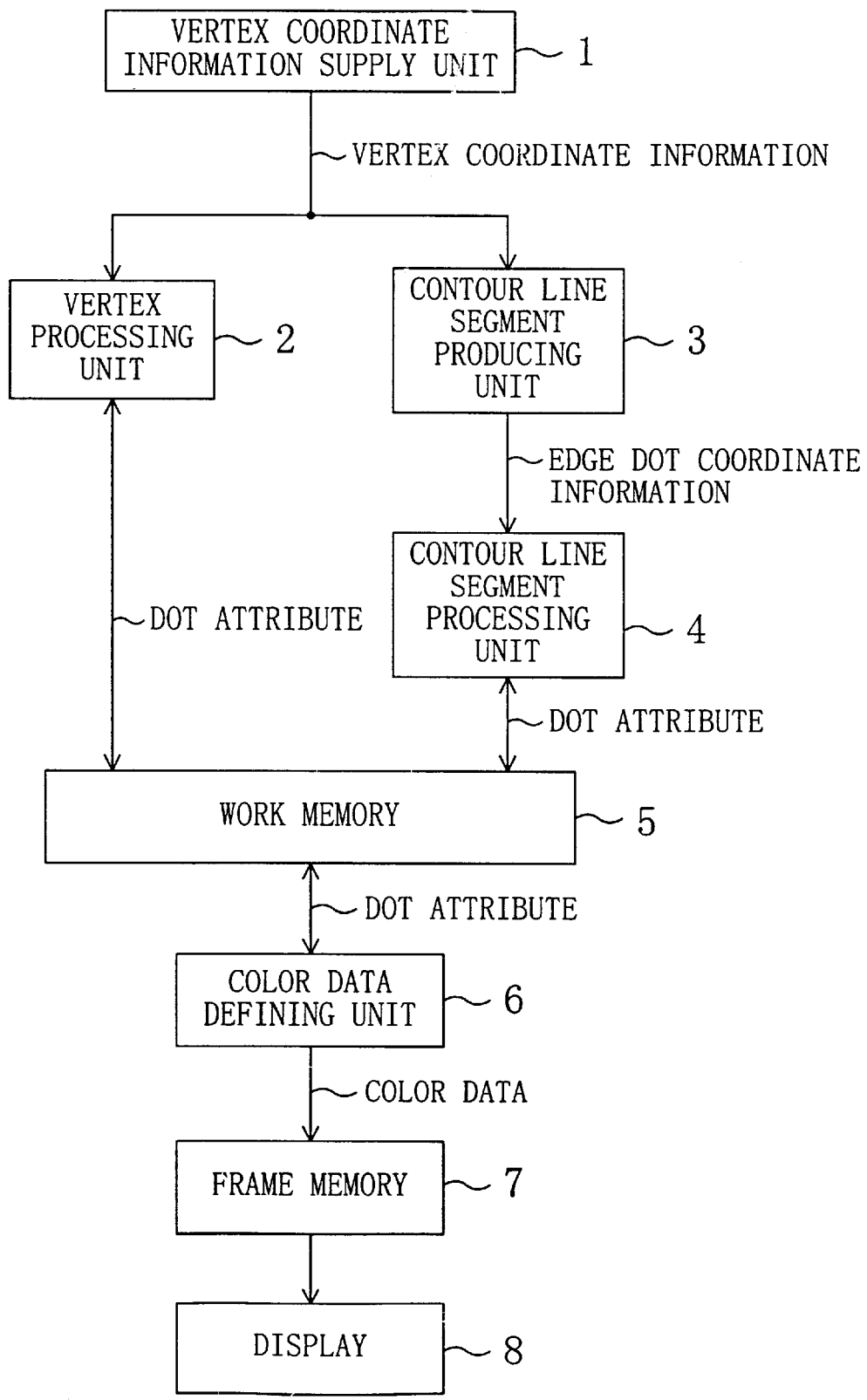
FIG. 1 is a block diagram illustrating an exemplary configuration of a figure filling apparatus according to the present invention.

FIG. 1 is a block diagram illustrating an exemplary configuration of a figure filling apparatus according to the present invention. The apparatus shown in FIG. 1 is adapted to define contour color data for each of a plurality of dots representing the contour of a given figure and inner color data for each of another plurality of dots representing the inside of the figure. The apparatus includes: a vertex coordinate information supply unit 1; a vertex processing unit 2; a contour line segment producing unit 3; a contour line segment processing unit 4; a work memory 5; a color data defining unit 6; a frame memory 7; and a display 8. The vertex coordinate information supply unit 1 supplies vertex coordinate information including the x and y coordinates of each of a plurality of vertex dots. The vertex processing unit 2 selects one of these vertex dots after another and labels each selected dot as a vertical or horizontal attribute dot. The contour line segment producing unit 3 selects one pair of adjacent vertex dots after another from these vertex dots, and defines the x and y coordinates of each of a plurality of edge dots located on a contour line segment connecting these two vertex dots together. The contour line segment processing unit 4 selects one of these edge dots on the contour line segment after another and labels each selected edge dot as a vertical or horizontal attribute dot. The attributes of the respective dots labeled as such are stored as "dot attribute information" in the work memory 5. By reference to the dot attribute information stored in the work memory 5, the color data defining unit 6 defines color data for each of a plurality of dots representing the contour and inside of the figure. The color data defined in this manner are stored in the frame memory 7 on a dot-by-dot basis. And based on the color data stored in the frame memory 7, the figure filled is presented on the display 8. The vertex coordinate information supply unit 1 includes a vertex coordinate table, in which the x and y coordinates of the multiplicity of vertex dots are stored according to the order in which these vertex dots are connected to each other. In the following illustrative embodiment, each pair of adjacent vertex dots are supposed to be connected to each other by a linear contour line segment, i.e., a side, and an enclosed polygon, defined by the vertex coordinate table, is supposed to be processed. When the length of a side is zero because of a projective transformation from a three-dimensional figure into a two-dimensional one, i.e., if two adjacent vertex dots overlap each other, one of the two vertex dots represents the other in the vertex coordinate table. The work memory 5 assigns 2 bits to a single dot, while the frame memory 7 assigns 8 bits to a single dot so as to display an image in 256 colors.

Figure 2:
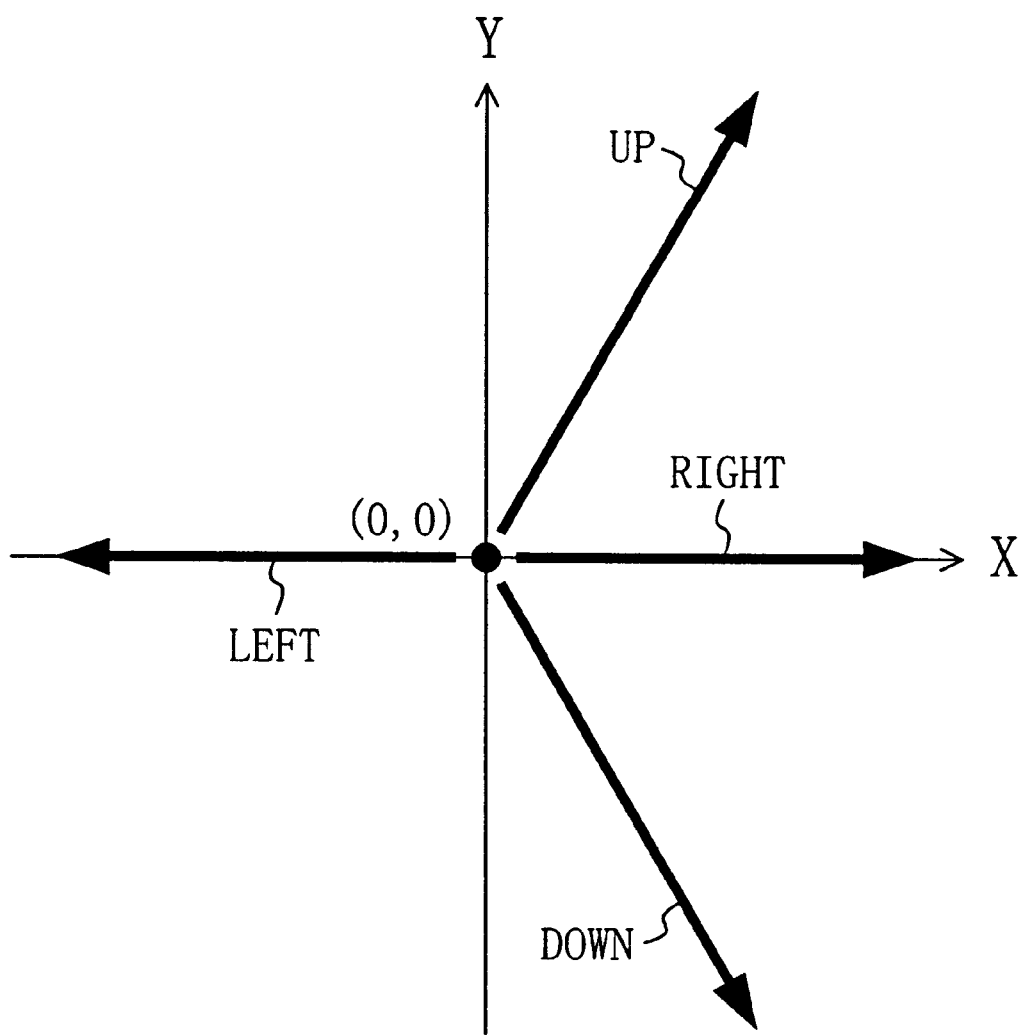
FIG. 2 illustrates how the direction of a side vector is determined by the figure filling apparatus shown in FIG. 1.

FIG. 2 illustrates how the direction of a side vector is determined by the figure filling apparatus shown in FIG. 1. In response to the information supplied from the vertex coordinate information supply unit 1, the vertex processing unit 2 selects one of the vertex dots after another, and classifies each of the directions of first and second side vectors as "UP", "DOWN", "RIGHT" or "LEFT". In this illustrative example, the "first" side vector terminates at the selected vertex dot and originates from a previous vertex dot, while the "second" side vector originates from the selected vertex dot and terminates at a next vertex dot. As shown in FIG. 2, if the y coordinate at the terminal point of a side vector is larger than that at the initial point thereof, then the direction of the side vector is determined as "UP". If the y coordinate at the terminal point of a side vector is smaller than that at the initial point thereof, then the direction of the side vector is determined as "DOWN". If the y coordinates are equal to each other at the initial and terminal points of a side vector but the x coordinate at the terminal point is larger than that at the initial point, then the direction of the side vector is determined as "RIGHT". And if the y coordinates are equal to each other at the initial and terminal points of a side vector but the x coordinate at the terminal point is smaller than that at the initial point, then the direction of the side vector is determined as "LEFT".

Figure 3:
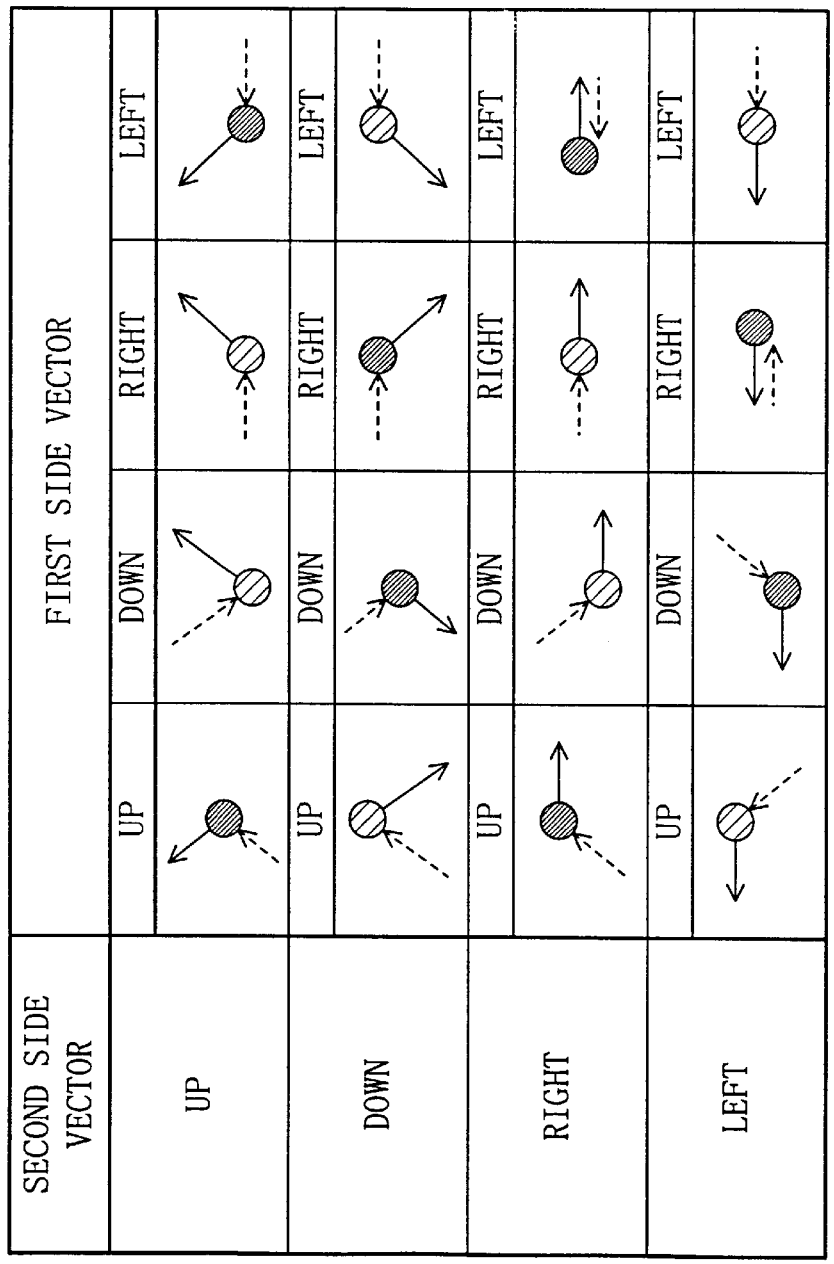
FIG. 3 illustrates a rule, on which the figure filling apparatus shown in FIG. 1 defines the attribute of a vertex dot.

FIG. 3 illustrates a rule, on which the figure filling apparatus shown in FIG. 1 labels a vertex dot as "vertical" or "horizontal". The vertex processing unit 2 labels a selected vertex dot as "vertical" or "horizontal" attribute dot depending on a combination of the directions of the first and second side vectors of the vertex dot in question. In FIG. 3, broken arrows indicate the directions of first side vectors and the solid arrows indicate those of second side vectors. As shown in FIG. 3, the vertex dot in question is 25 labeled as "vertical attribute dot (V)" if the directions of first and second vectors are both "UP"; if the directions of first and second vectors are "LEFT" and "UP", respectively; if the directions of first and second vectors are both "DOWN"; if the directions of first and second vectors are "RIGHT" and "DOWN", respectively; if the directions of first and second vectors are "UP" and "RIGHT", respectively; if the directions of first and second vectors are "LEFT" and "RIGHT", respectively; if the directions of first and second vectors are "DOWN" and "LEFT", respectively; and if the directions of first and second vectors are "RIGHT" and "LEFT", respectively. Otherwise, the vertex dot in question is labeled as "horizontal attribute dot (H)". For example, 2-bit information "10" is assigned to a vertical attribute dot, while 2-bit information "11" is assigned to a horizontal attribute dot. All the dot attribute information stored in the work memory 5 may be initialized to "00" in advance. In FIG. 3 and the other drawings, vertical attribute dots (V) are represented by dense hatching, while horizontal attribute dots (H) are represented by sparse hatching.

Figure 4:
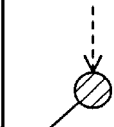
FIG. 4 illustrates another rule, on which the figure filling apparatus shown in FIG. 1 defines the attribute of a vertex dot.

FIG. 4 illustrates another rule, on which the figure filling apparatus shown in FIG. 1 labels a vertex dot as "vertical" or "horizontal". In FIG. 4, the vertex processing unit 2 labels a vertex dot in question as "vertical attribute dot (V)" if the directions of first and second vectors are both "UP"; if the directions of first and second vectors are "RIGHT" and "UP", respectively; if the directions of first and second vectors are both "DOWN"; if the directions of first and second vectors are "LEFT" and "DOWN", respectively; if the directions of first and second vectors are "DOWN" and "RIGHT", respectively; if the directions of first and second vectors are "LEFT" and "RIGHT", respectively; if the directions of first and second vectors are "UP" and "LEFT", respectively; and if the directions of first and second vectors are "RIGHT" and "LEFT", respectively. Otherwise, the vertex dot in question is labeled as "horizontal attribute dot (H)".

Figure 5A:
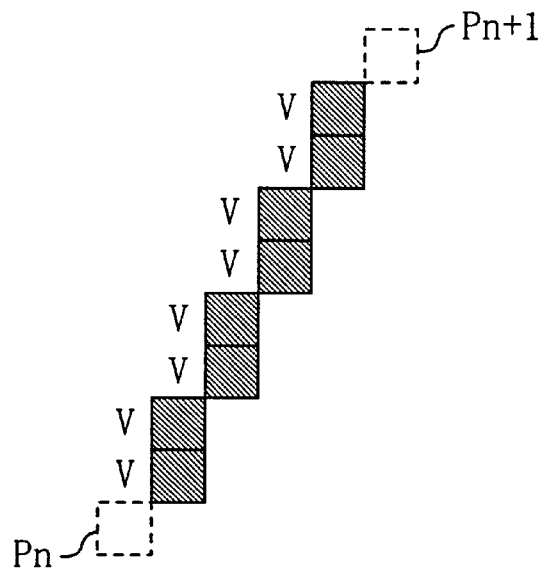
FIGS. 5A, 5B and 5C illustrate three exemplary combinations of vertical and/or horizontal edge dots labeled as such by the figure filling apparatus shown in FIG. 1.
Figure 5B:
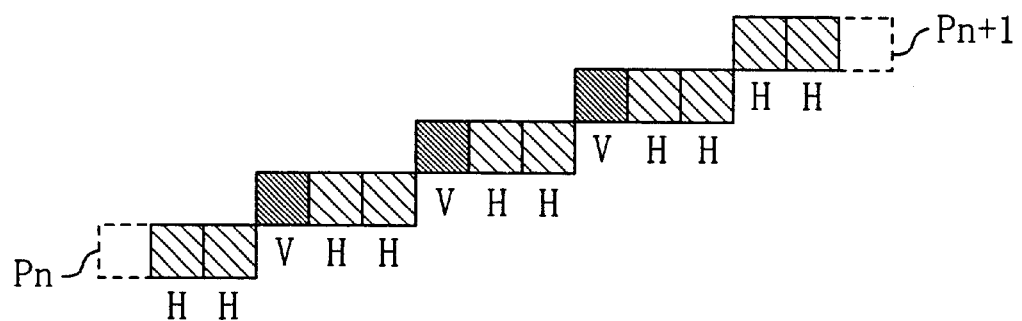
Figure 5C:
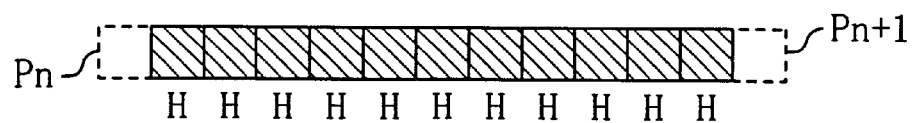

FIGS. 5A, 5B and 5C illustrate three exemplary combinations of vertical and/or horizontal edge dots labeled as such by the figure filling apparatus shown in FIG. 1. In accordance with the technique of a digital differential analyzer (DDA), the contour line segment producing unit 3 selects a pair of adjacent vertex dots Pn and Pn+1 and sequentially produces the x and y coordinates of each of a plurality of edge dots on the contour line segment connecting these two vertex dots together. It should be noted that if the contour line segment is extremely short, a simple technique other than the DDA's may be employed. The contour line segment processing unit 4 selects one of these edge dots after another, and labels the edge dot in question as "vertical attribute dot (V)" if the y coordinate of the edge dot is different from that of a previous edge dot and that of the vertex dot Pn+1located at the terminal point of the contour line segment. Otherwise, the contour line segment processing unit 4 labels the edge dot as "horizontal attribute dot (H)". Accordingly, if a side has an ascent larger than 1, then all the edge dots on the side are labeled as "vertical attribute dots" as shown in FIG. 5A. On the other hand, if a side has an ascent smaller than 1, then vertical and horizontal dots coexist on the single side as shown in FIG. 5B. Furthermore, if a side is horizontal, then all the edge dots on the side are labeled as "horizontal attribute dots" as shown in FIG. 5C.

In a polygon in an arbitrary shape, a vertex may overlap another vertex or a side, and a side may overlap another side or a vertex. In particular, when the respective vertices of a three-dimensional figure are projected to form a two-dimensional figure by a projective transformation technique, such overlapping happens frequently. Thus, every time a dot is newly labeled as vertical or horizontal attribute dot, the vertex and contour line segment processing units 2 and 4 consults the dot attribute information stored in the work memory 5 to determine whether or not the corresponding information in the work memory 5 should be updated. If the dot attribute read out from the work memory 5 is the initial value "00"1, then the dot attribute to be newly determined is written into the work memory 5 as it is.

FIG. 6 illustrates a rule relating to dot overlap processing for the figure filling apparatus shown in FIG. 1. As shown in FIG. 6, in newly determining the attribute of a dot that has already been processed and labeled as vertical or horizontal attribute dot, the vertex and contour line segment processing units 2 and 4 label the processed dot as horizontal (H) if the dot attribute newly determined coincides with the previous dot attribute. Otherwise, the units 2 and 4 label the dot as vertical (V).

Figure 7:
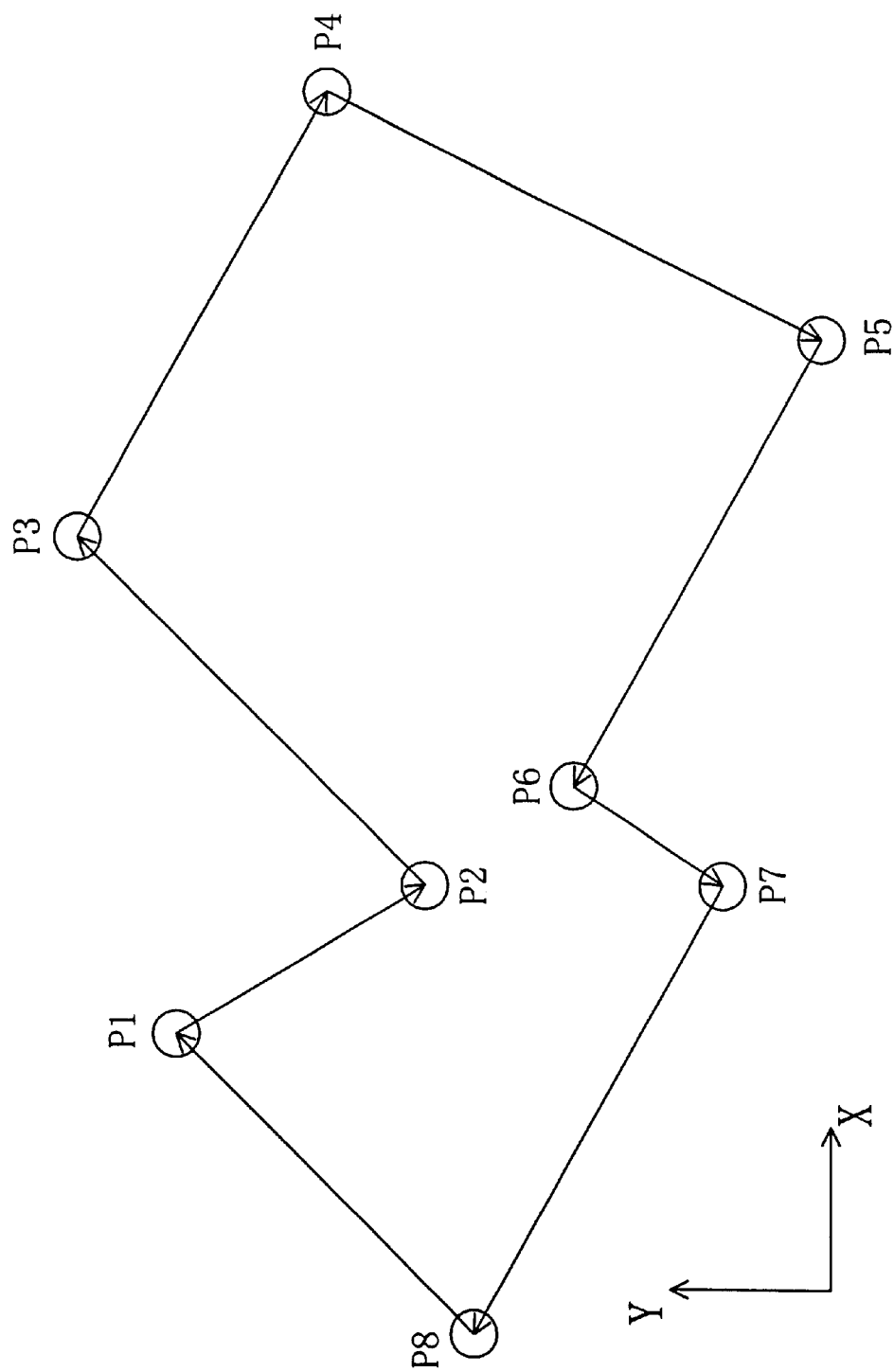
FIG. 7 illustrates a specific exemplary figure to be filled.

FIG. 7 illustrates a specific exemplary figure to be filled. In FIG. 7, respective vertex dots are identified by P1 through P8. In the figure filling apparatus shown in FIG. 1, first, the vertex processing unit 2 labels the vertex dot P1 as a horizontal attribute dot (H) according to the rule shown in FIG. 3. As a result, dot attribute information "11" is written at a corresponding position in the work memory 5. Next, while the contour line segment producing unit 3 produces the respective x and y coordinates of a plurality of edge dots on the side connecting the vertex dots P1 and P2 together, the contour line segment processing unit 4 defines the respective dot attributes of these edge dots. This processing is pursued continuously until one dot ahead of the vertex dot P2. By making the vertex processing unit 2, contour line segment producing unit 3 and contour line segment processing unit 4 repeatedly perform similar processing after that, the respective attribute information items of a plurality of dots, representing the contour of the target figure, are written into the work memory 5.

Figure 8:
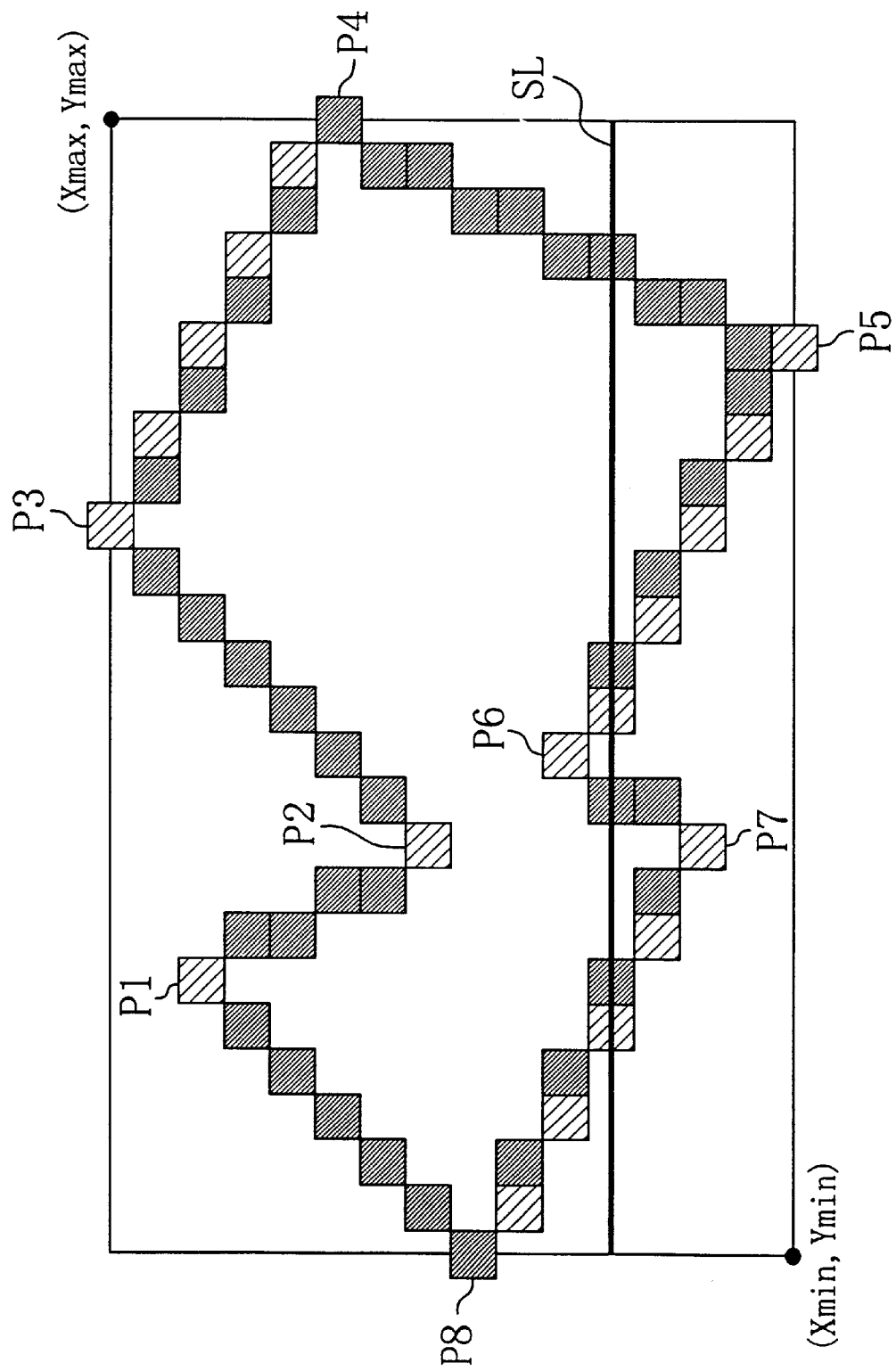
FIG. 8 illustrates resulting dot attributes defined for the contour of the figure shown in FIG. 7.

FIG. 8 illustrates resulting dot attributes defined for the contour of the figure shown in FIG. 7. In FIG. 8, whenever an arbitrary scan line SL is drawn in parallel to the axis of x coordinates, the number of vertical attribute dots existing on the scan line SL is zero or an even number. Stated otherwise, the rules shown in FIGS. 3 and 4 are laid down such that respective dot attributes defined form such a pattern. The color data defining unit 6 scans respective dots enclosed inside a rectangle defined by the two points (Xmin, Ymin) and (Xmax, Ymax) shown in FIG. 8, i.e., a rectangle circumscribing the figure to be filled. In this example, Xmin is the minimum x coordinate among those of the eight vertex dots, Ymin is the minimum y coordinate among those of the eight vertex dots, Xmax is the maximum x coordinate among those of the eight vertex dots, and Ymax is the maximum y coordinate among those of the eight vertex dots. Furthermore, the color data defining unit 6 defines contour color data for all the dots that have been labeled as vertical or horizontal attribute dots by the vertex and contour line segment processing units 2 and 4. Also, the color data defining unit 6 selects one of a plurality of scan lines parallel to the axis of x coordinates after another, and defines inner color data for all the dots located between an odd-numbered vertical attribute dot and an even-numbered vertical attribute dot next to the former dot on the selected scan line. In this case, the horizontal dots are excluded from the definition of inner color data. Specifically, as for the scan line SL shown in FIG. 8, the inner color data are defined for three dots located between the first and second vertical attribute dots and for eight dots located between the third and fourth vertical attribute dots.

Figure 9:
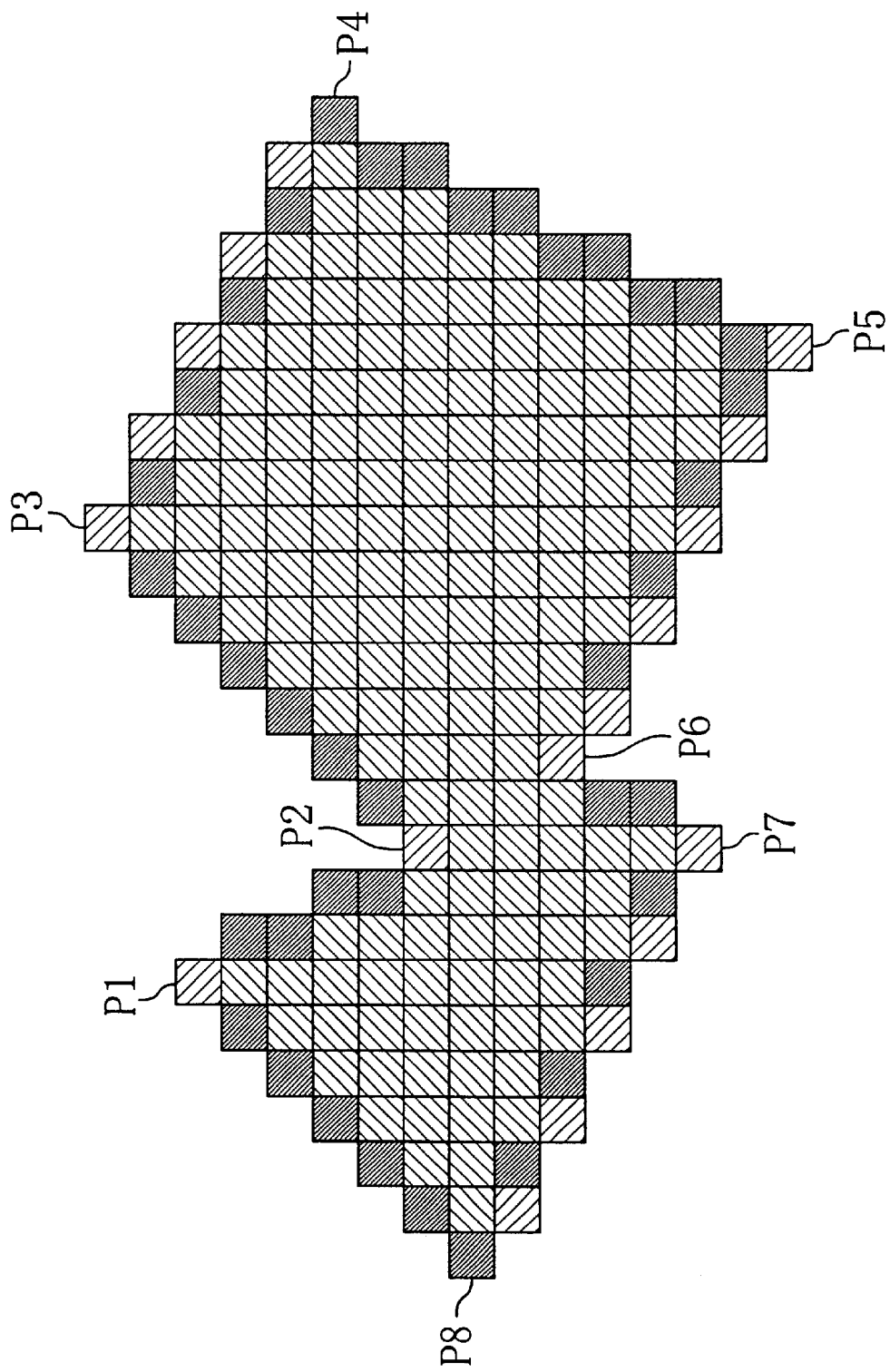
FIG. 9 illustrates resulting inner dots detected from the figure shown in FIG. 7.

When the color data defining unit 6 detects a dot, for which inner color data should be defined, i.e., an inner dot, the unit 6 assigns 2-bit attribute information, e.g., "01", to the inner dot and then writes the attribute information into the work memory 5. That is to say, after all the dots have been scanned to detect the inner dots, scanning is performed again to define color data. FIG. 9 illustrates the inner dots detected from the figure shown in FIG. 7. In FIG. 9, the inner dots are indicated by the hatching with leftward diagonals. The inner dot attribute information, which has been written into the work memory 5, can be advantageously consulted numerous times to "re-fill" the inner dots. Alternatively, without writing the inner dot attribute information into the work memory 5, color data may be defined for the respective dots while the inner dots are being detected.

The color data, which have been defined by the color data defining unit 6 for the respective dots, are stored in the frame memory 7. Based on the color data stored in the frame memory 7, the display 8 presents the results of filling the given figure. It should be noted that the contour color data and the inner color data may be either different from each other or the same. Also, the contour color data and the inner color data may be not just chromatic data, but achromatic data. If the contour color data are different from the inner color data, then a fringed figure can be drawn. Furthermore, the color data defining unit 6 can define the inner color data simultaneously with the contour color data.

Figure 10:
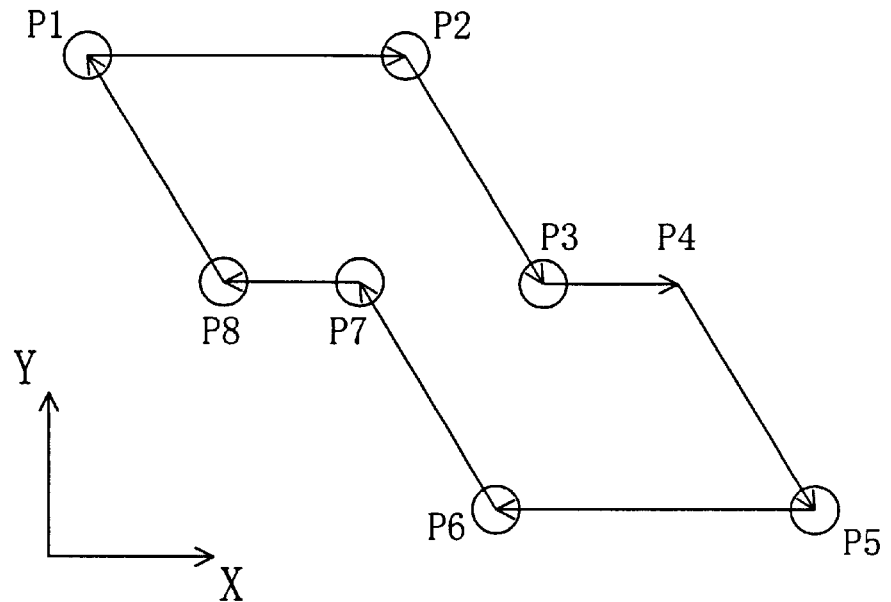
FIG. 10 illustrates a specific example of a figure with a plurality of horizontal sides.

FIG. 10 illustrates a specific example of a figure with a plurality of horizontal sides, i.e., the sides P1–P2, P3–P4, P5–P6 and P7–P8.

Figure 11:
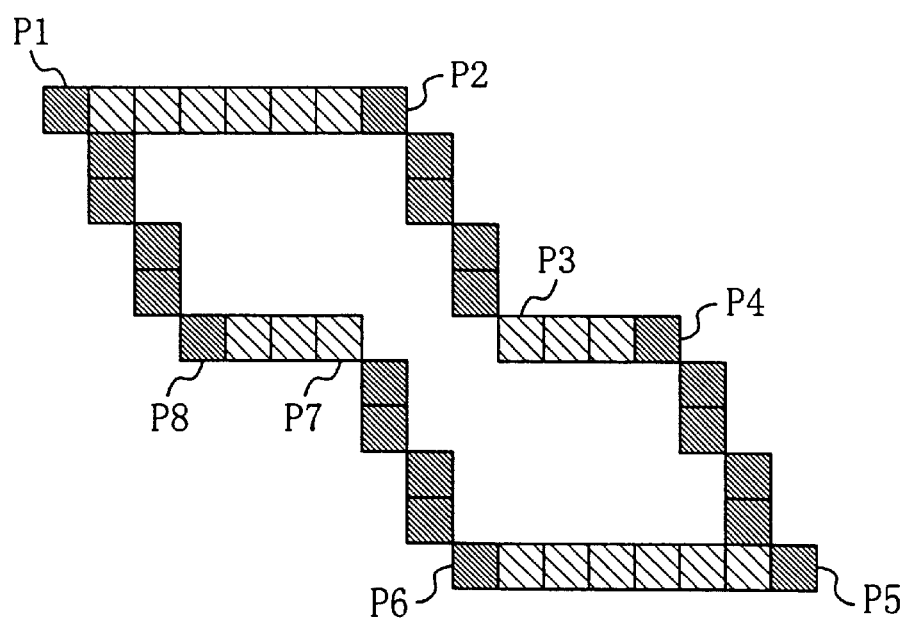
FIG. 11 illustrates resulting dot attributes defined for the contour of the figure shown in FIG. 10 according to the rule shown in FIG. 3.
Figure 12:
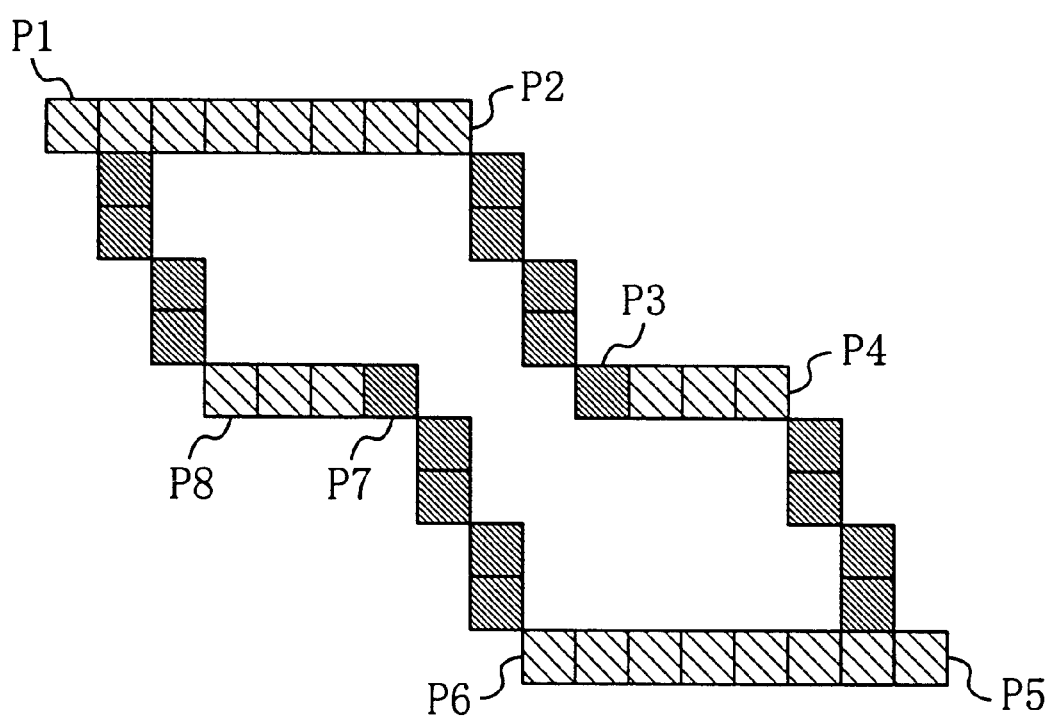
FIG. 12 illustrates resulting dot attributes defined for the contour of the figure shown in FIG. 10 according to the rule shown in FIG. 4.

FIG. 11 illustrates resulting dot attributes defined for the contour of the figure shown in FIG. 10 according to the rule shown in FIG. 3. on the other hand, FIG. 12 illustrates resulting dot attributes defined for the contour of the figure shown in FIG. 10 according to the rule shown in FIG. 4. In either case shown in FIG. 11 or 12, the number of vertical attribute dots existing on an arbitrary scan line parallel to the axis of x coordinates is always zero or two. Accordingly, the color data defining unit 6 can detect the inner dots correctly.

Figure 13A:
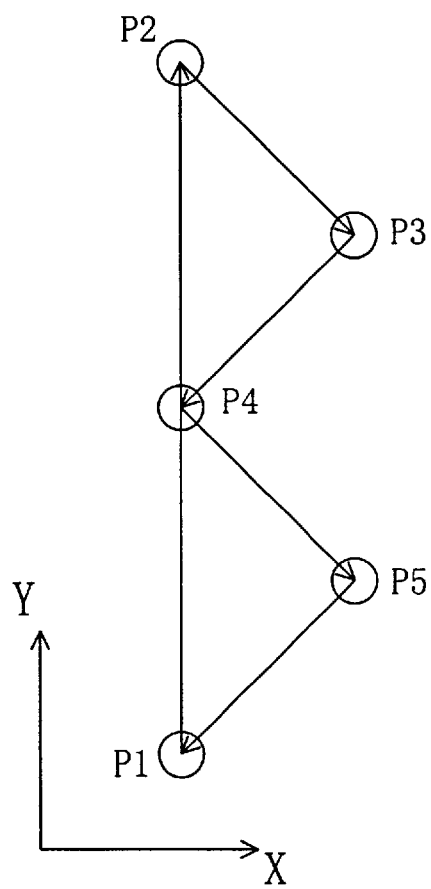
FIGS. 13A and 13B illustrate a working example of dot overlap processing.
Figure 13B:
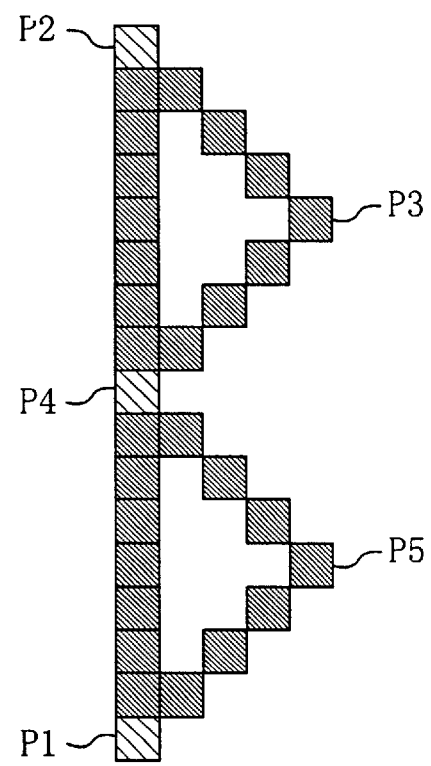

FIGS. 13A and 13B illustrate a working example of dot overlap processing: FIG. 13A illustrates a specific example of a figure to be filled; and FIG. 13B illustrates resulting dot attributes defined for the contour of the figure shown in FIG. 13A. When the vertex processing unit 2 is going to label a vertex dot P4 as a vertical attribute dot (see FIGS. 3 and 4), the dot was already labeled as a vertical attribute dot while the contour line segment processing unit 4 processed the side P1–P2 (see FIG. 5A). Thus, according to the rule on the first row in FIG. 6, the vertex processing unit 2 labels the vertex dot P4 as a horizontal attribute dot, and writes the dot attribute into the work memory 5. In the example shown in FIG. 13B, since the number of vertical attribute dots existing on an arbitrary scan line parallel to the axis of x coordinates is always zero or two, the color data defining unit 6 can detect the inner dots correctly.

Figure 14A:
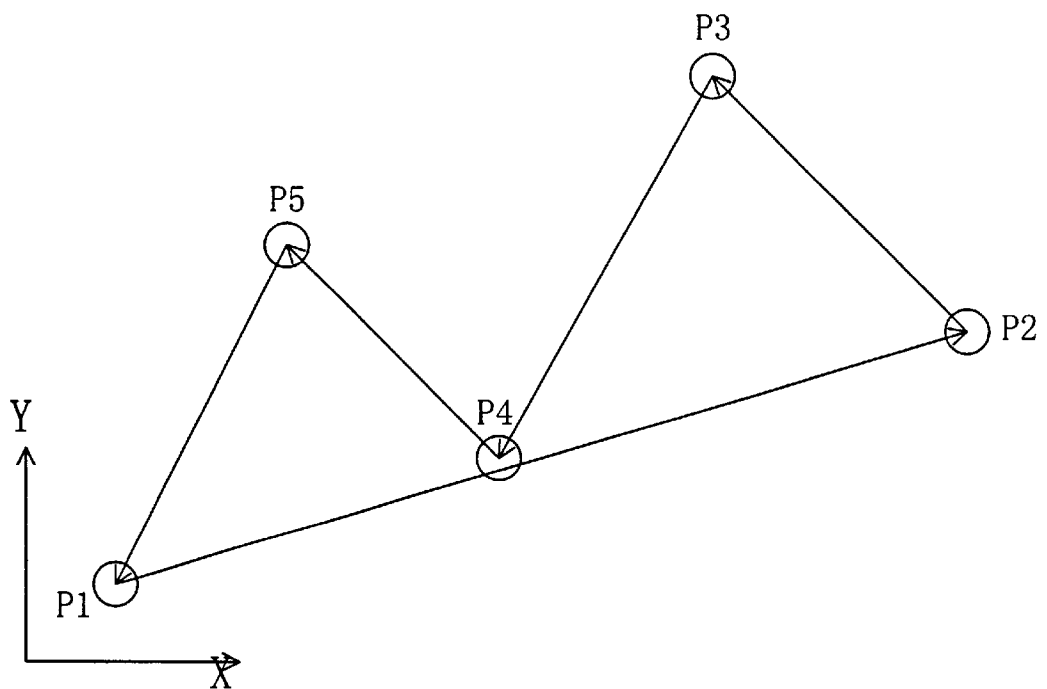
FIGS. 14A and 14B illustrate another working example of dot overlap processing.
Figure 14B:
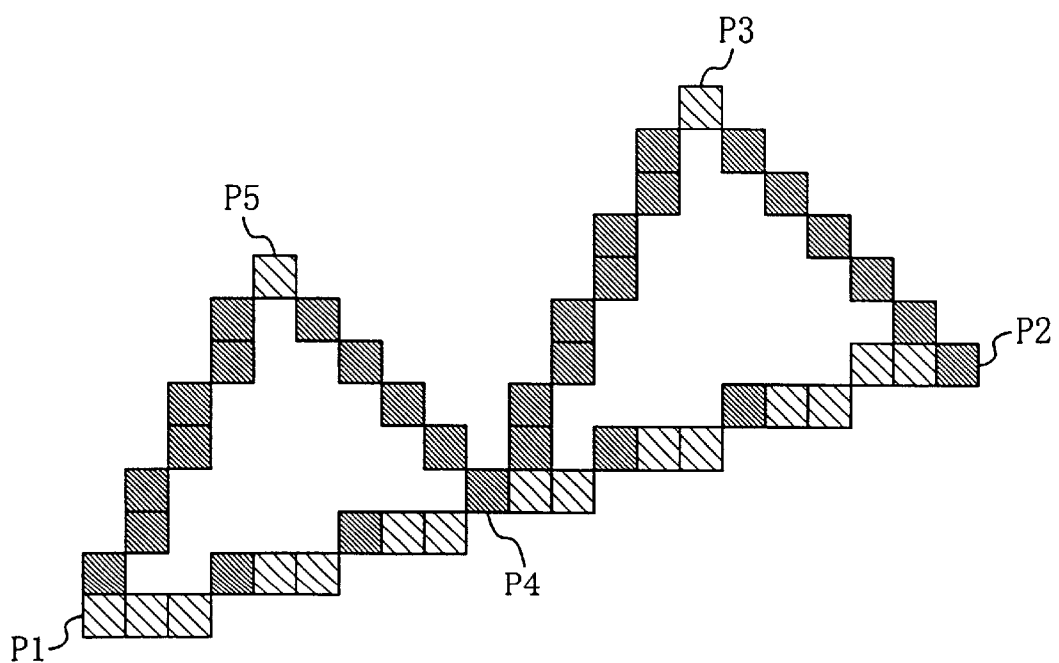

FIGS. 14A and 14B illustrate another working example of dot overlap processing: FIG. 14A illustrates a specific example of a figure to be filled; and FIG. 14B illustrates resulting dot attributes defined for the contour of the figure shown in FIG. 14A. When the vertex processing unit 2 is going to label a vertex dot P4 as a horizontal dot (see FIGS. 3 and 4), the dot was already labeled as a vertical attribute dot while the contour line segment processing unit 4 processed the side P1–P2 (see FIG. 5B). Thus, according to the rule on the third row in FIG. 6, the vertex processing unit 2 labels the vertex dot P4 as a vertical attribute dot, and writes the dot attribute into the work memory 5. In the example shown in FIG. 14B, since the number of vertical attribute dots existing on an arbitrary scan line parallel to the axis of x coordinates is always zero or an even number, the color data defining unit 6 can detect the inner dots correctly.

No matter whether the vertex dots are arranged clockwise as shown in FIGS. 7, 10 and 13A or counterclockwise as shown in FIG. 14A, the figure filling apparatus shown in FIG. 1 can perform the filling processing correctly. Also, if the respective x and y coordinates of a plurality of edge dots making up a curvilinear contour line segment are sequentially produced by the contour line segment producing unit 3, then a figure with curves can also be filled.

Figure 15:
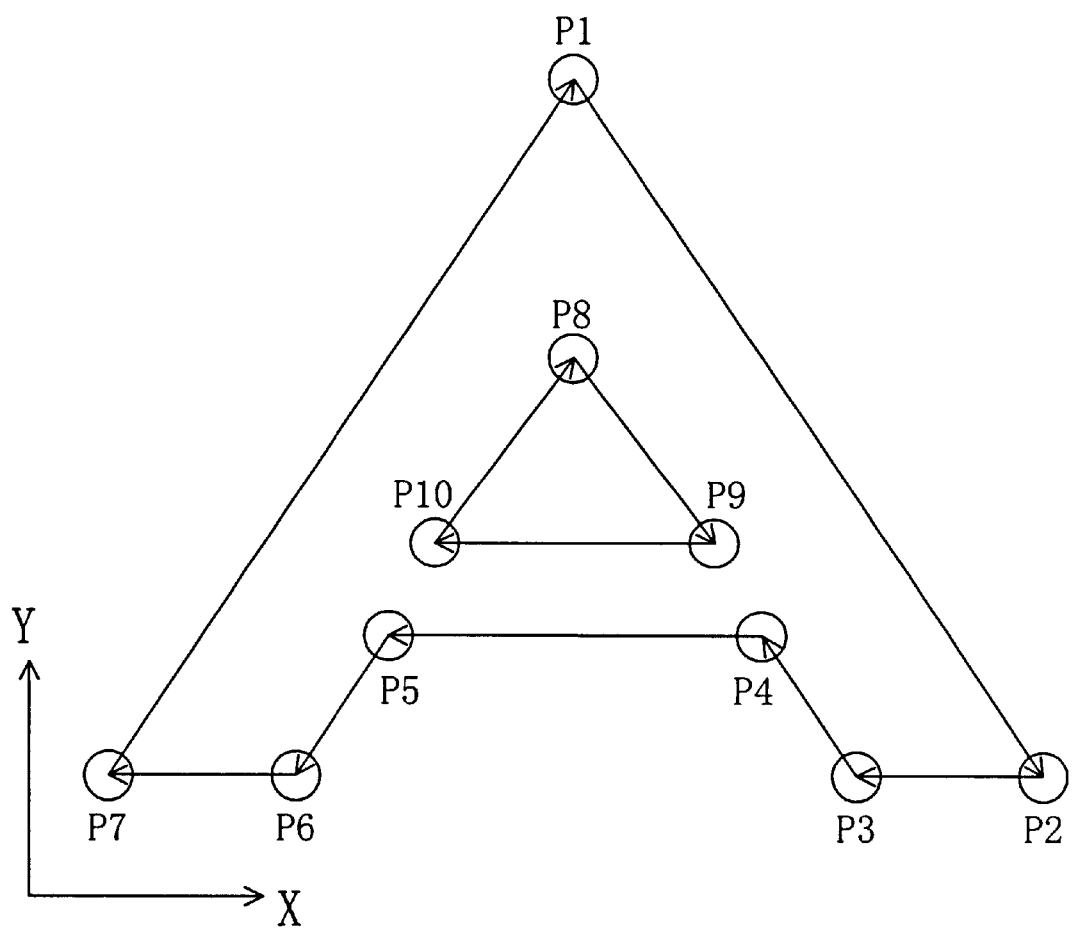
FIG. 15 illustrates a specific example of a figure with double contour loops.

FIG. 15 illustrates a character "A", which is a specific example of a figure with double contour loops. In FIG. 15, P1 through P7 indicate respective vertex dots making up an outer contour loop, while P8 through P10 indicate respective vertex dots making up an inner contour loop. In the example shown in FIG. 15, these contour loops are both directed clockwise.

Figure 16:
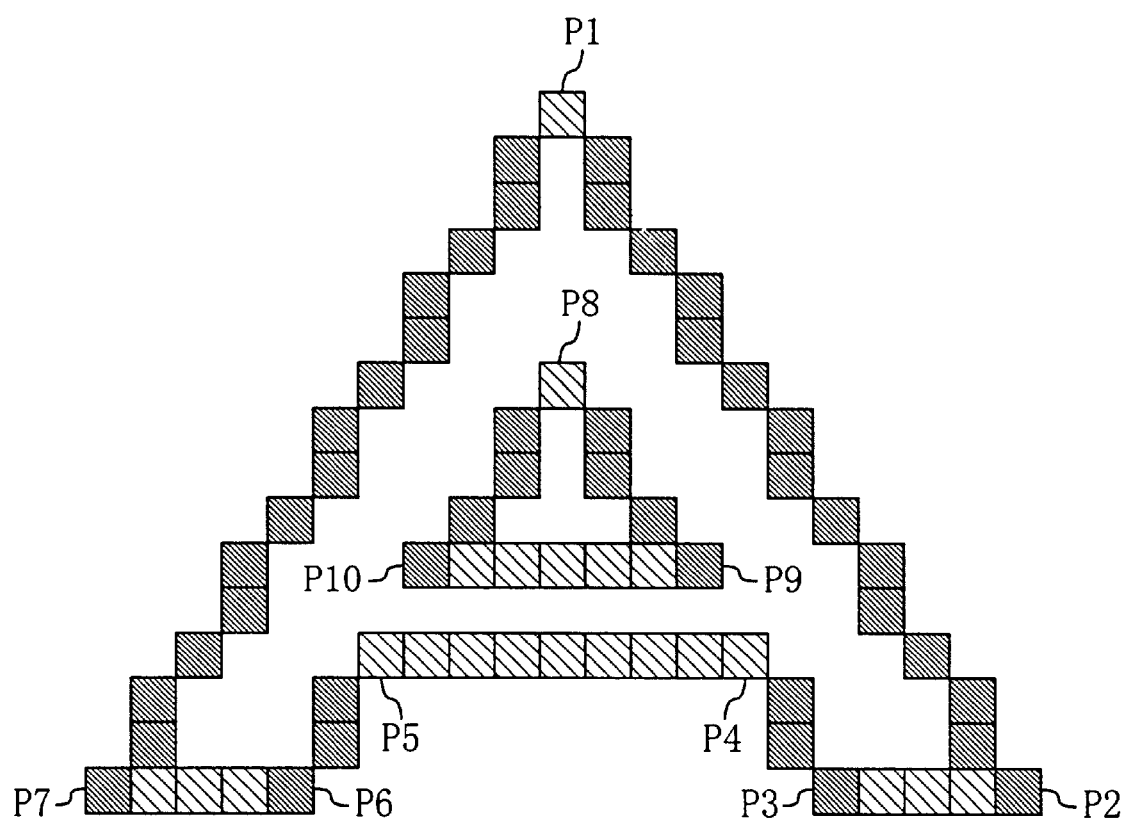
FIG. 16 illustrates resulting dot attributes defined for the contours of the figure shown in FIG. 15.

FIG. 16 illustrates resulting dot attributes defined for the contours of the figure shown in FIG. 15. The figure filling apparatus shown in FIG. 1 labels the two sets of vertex dots P1 through P7 and P8 through P10 as vertical or horizontal attribute dots according to the rule shown in FIG. 3. The edge dots are labeled as in the examples shown in FIGS. 5A through 5C. After the dot attributes defined for all the dots shown in FIG. 16 have been stored in the work memory 5, the color data defining unit 6 starts to detect the inner dots.

Figure 17:
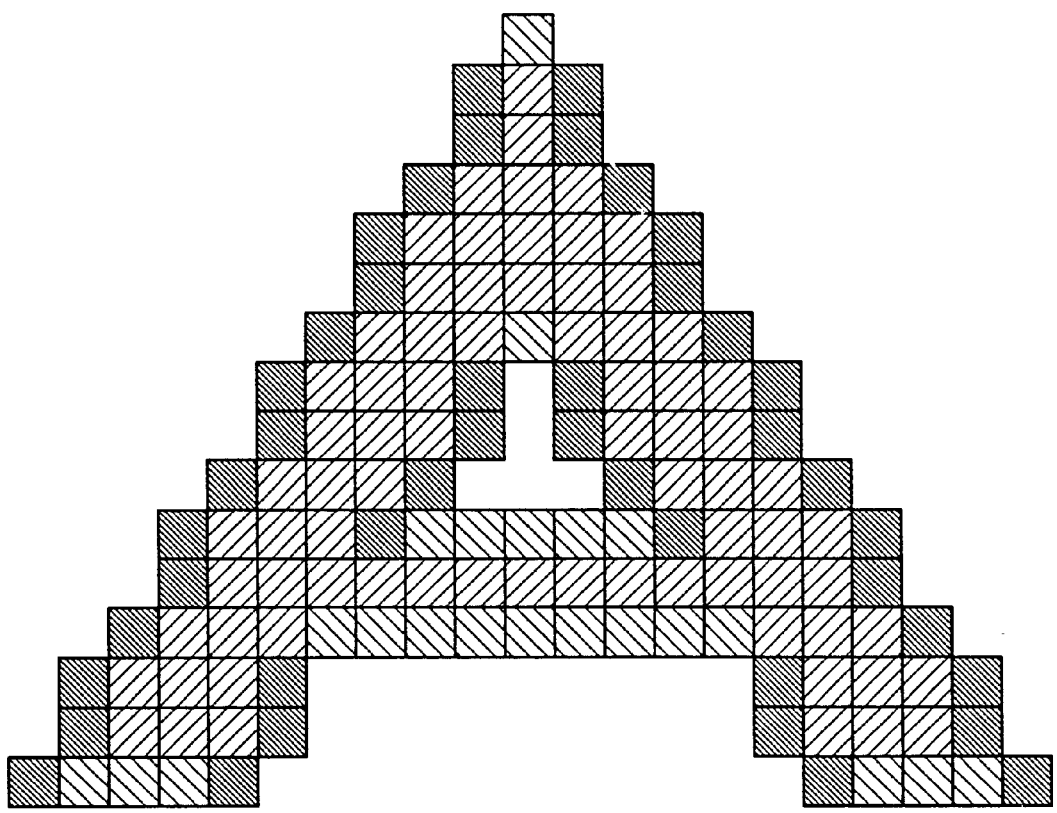
FIG. 17 illustrates resulting inner dots detected from the figure shown in FIG. 15.

FIG. 17 illustrates resulting inner dots detected from the figure shown in FIG. 15. In the example shown in FIGS. 16 and 17, since the number of vertical attribute dots existing on an arbitrary scan line parallel to the axis of x coordinates is always zero or an even number, the color data defining unit 6 can detect the inner dots correctly. That is to say, the figure filling apparatus shown in FIG. 1 can fill a figure with double contour loops correctly, no matter whether the directions of these contour loops are the same or opposite. Furthermore, if the contour color data are different from the inner color data, a fringed character "A" can be drawn.

The figure filling apparatus shown in FIG. 1 is applicable to various computer-graphics-related technologies. For example, the present invention is applicable to displaying a bird's-eye view in a car navigation system. In a town map displayed, there are a lot of figures to be fringed like buildings and blocks. Also, when respective vertices of a three-dimensional figure are transferred by projective transformation to those of a two-dimensional figure to display a bird's-eye view, the vertices and sides of the figures frequently overlap each other. However, the apparatus shown in FIG. 1 can perform the figure filling processing at a high speed even under such conditions. If a figure to be presented cannot be fully displayed on the screen of the display 8, then the figure should be subjected to clipping processing. It should be noted that the display shown in FIG. 1 may be not only CRT or liquid crystal display, but also a printer.

In the foregoing description, the attributes of vertex dots are supposed to be defined according to the rule shown in FIG. 3 or 4, and those of edge dots are supposed to be defined as in the examples shown in FIGS. 5A through 5C. Alternatively, the attributes of these dots may be defined according to any other rule or example so long as all the dots representing the contour of a given figure are labeled as vertical or horizontal attribute dots in such a manner that the number of vertical attribute dots existing on an arbitrary scan line parallel to a certain axis or coordinates is always zero or an even number.

What is claimed is:

1. A figure filling apparatus for defining contour color data for a plurality of dots representing the contour of a given figure and inner color data for another plurality of dots representing the inside of the figure, the apparatus comprising:

first means for labeling each of the dots representing the contour of the figure as a vertical or horizontal attribute dot such that the number of vertical attribute dots, existing on arbitrary one of scan lines parallel to a certain axis of coordinates, is always zero or an even number; and second means for defining the contour color data for all the dots labeled by the first means as the vertical or horizontal attribute dots, selecting one of the scan lines parallel to the axis of coordinates after another, excluding horizontal attribute dots from all the dots on the scan line selected, and defining the inner color data for the remaining dots existing between an odd-numbered vertical attribute dot and an even-numbered vertical attribute dot, which is next to the former dot, on the-scan line selected.

2. The apparatus of claim 1, wherein in newly labeling a dot, which has already been processed and labeled as a vertical or horizontal attribute dot, as a vertical or horizontal attribute dot, the first means labels the processed dot as a horizontal attribute dot if a dot attribute newly defined coincides with a previous dot attribute, or otherwise, as a vertical attribute dot.

3. A figure filling apparatus for defining contour color data for a plurality of dots representing the contour of a given figure and inner color data for another plurality of dots representing the inside of the figure, the apparatus comprising:

a vertex coordinate information supply unit for supplying vertex coordinate information including x and y coordinates of each of a plurality of vertex dots of the figure;

a vertex processing unit for selecting one of the vertex dots after another, determining, from the vertex coordinate information, the direction of a first vector terminating at the selected vertex dot and originating from a previous vertex dot and the direction of a second vector originating from the selected vertex dot and terminating at a next vertex dot, and labeling the selected dot as a vertical or horizontal attribute dot based on the directions of the first and second vectors;

a contour line segment producing unit for selecting one pair of adjacent vertex dots after another from the vertex dots, and defining, from the vertex coordinate information, the x and y coordinates of each of a plurality of edge dots located on a contour line segment connecting together the two vertex dots selected;

a contour line segment processing unit for selecting one of the edge dots on the contour line segment after another and labeling the selected edge dot as a vertical attribute dot if the y coordinate of the edge dot selected is different from that of a previous edge dot and that of the vertex dot located at the terminal point of the contour line segment, or otherwise, as a horizontal attribute dot; and a color data defining unit for defining the contour color data for all the dots labeled by the vertex processing unit and the contour line segment processing unit as the vertical or horizontal attribute dots, selecting one of the scan lines parallel to the axis of x coordinates after another, excluding horizontal attribute dots from all the dots on the scan line selected, and defining the inner color data for the remaining dots existing between an odd-numbered vertical attribute dot and an even-numbered vertical attribute dot, which is next to the former dot, on the scan line selected.

4. The apparatus of claim 3, wherein the vertex processing unit classifies each of the directions of the first and second vectors as up, down, right or left based on the vertex coordinate information, and labels the selected vertex dot as a vertical attribute dot if the directions of the first and second vectors are both up; if the directions of the first and second vectors are left and up, respectively; if the directions of the first and second vectors are both down; if the directions of the first and second vectors are right and down, respectively; if the directions of the first and second vectors are up and right, respectively; if the directions of the first and second vectors are left and right, respectively; if the directions of the first and second vectors are down and left, respectively; and if the directions of the first and second vectors are right and left, respectively, or otherwise, as a horizontal attribute dot.

5. The apparatus of claim 3, wherein the vertex processing unit classifies each of the directions of the first and second vectors as up, down, right or left based on the vertex coordinate information, and labels the selected vertex dot as a vertical attribute dot if the directions of the first and second vectors are both up; if the directions of the first and second vectors are right and up, respectively; if the directions of the first and second vectors are both down; if the directions of the first and second vectors are left and down, respectively; if the directions of the first and second vectors are down and right, respectively; if the directions of the first and second vectors are left and right, respectively; if the directions of the first and second vectors are up and left, respectively; and if the directions of the first and second vectors are right and left, respectively, or otherwise, as a horizontal attribute dot.

6. The apparatus of claim 3, wherein in newly labeling a dot, which has already been processed and labeled as a vertical or horizontal attribute dot, as a vertical or horizontal attribute dot, the vertex processing unit and the contour line segment processing unit label the processed dot as a horizontal attribute dot if a dot attribute newly defined coincides with a previous dot attribute, or otherwise, as a vertical attribute dot.

* * * * *